United States Patent

[11] 3,619,624

[72] Inventor Glenn P. Sorenson
Woodside, Calif.
[21] Appl. No. 790,280
[22] Filed Jan. 10, 1969
[45] Patented Nov. 9, 1971
[73] Assignee Stanford Research Institute
Menlo Park, Calif.

[54] INSTRUMENT FOR MEASUREMENT OF OPTICAL CHARACTERISTICS OF WATER
6 Claims, 6 Drawing Figs.

[52] U.S. Cl. ........................................... 250/218,
250/43.5 D, 356/103, 356/201, 356/206
[51] Int. Cl. ........................................... G01n 21/26
[50] Field of Search ........................................ 250/218,
43.5 D; 356/201, 206, 204, 209, 103, 208

[56] References Cited
UNITED STATES PATENTS
3,416,865 12/1968 Townsend .................. 356/206

OTHER REFERENCES

" The Determination of Atmospheric Transmissivity by Backscatter from a Pulsed Light Separated System," Armed Services Information Agency, 243 930, Dec. 21, 1967.

Horman, " Measurement of Atmospheric Transmissivity using Backscattered Light from a Pulsed Light," J. of the Optical Society, Vol. 51, No. 6, June, 1961, p. 681– 690.

Tyler, J. E. and Richardson, " Nephelometer for the Measurement of Volume Scattering Function In Situ," J. of the Optical Society, Vol. 48, No. 5, May, 1958, pp. 354– 357.

Tyler, J. E., " Measurement of the Scattering Properties of Hydrosols," J. of the Optical Society of America, Vol. 51, No. 11, Nov., 1961, pp. 1289– 1293.

Primary Examiner—James W. Lawrence
Assistant Examiner—P. C. Nelms
Attorneys—Urban Faubion and Lindenberg & Freilich ABSTRACT: Apparatus for determining underwater optical characteristics is disclosed. One is the absorption coefficient (a) using a small cosine detector of area A at a distance R from a small (quasi point) source based on the equation:

$$P_d = P_0 \frac{A e^{-aR}}{4\pi R^2}$$

where $P_d$ is the radiant power incident upon the detector and $P_o$ is the radiant output of the source. Another is the backscattering coefficient (b) using either the same detector rotated 180° or a second detector based on the equation:

$P_{BZ} = P_0 e^{iaZ} b \, dZ$ where $P_{BZ}$ is the radiant power of all backscattered light from a volume element dZ thick at radius Z, and $a$ is the absorption coefficient. Allowance is made in determining $b$ for the fact that a small cosine detector is employed of area A in accordance with the equation $$P_D = b P_0 \frac{A}{4\pi R^2} e^{aR} \int_R^\infty e^{-2aZ} \left(1 - \sqrt{\frac{R^2}{Z^2}}\right) dZ$$

where $P_D$ is the radiant power incident upon the detector. By using spectral filters in the detectors, coefficients $a$ and $b$ can be measured as functions of optical wavelength. The coefficient of total scattering $s$ may be determined by measuring the coefficient of attenuation $\alpha$ and subtracting from it the absorption coefficient $a$.

*INVENTOR.*
GLENN P. SORENSON

BY Lindenberg & Freilich

ATTORNEYS

PATENTED NOV 9 1971 3,619,624

INVENTOR.
GLENN P. SORENSON
BY Lindenberg & Freilich
ATTORNEYS

INSTRUMENT FOR MEASUREMENT OF OPTICAL CHARACTERISTICS OF WATER

BACKGROUND OF THE INVENTION

This invention relates to apparatus for determining underwater optical characteristics, and in particular to apparatus and method for determining absorption, total scattering and backscattering characteristics of particular bodies of water at desired depths.

Recent activity in oceanography has given rise to a need for a wide variety of instruments, many having optical systems for use at such depths that little or no light would be available from the surface. To satisfy that need, new instruments must be developed, including instruments with which to predict underwater visibility from measured characteristics of the local water mass, and to determine actual optical characteristics of the water during underwater tests of instruments having optical systems undergoing evaluation.

While the primary interest is in determining optical characteristics of deep ocean water under conditions of artificial illumination, the measurement of such characteristics of fresh or shallow water are equally useful. It is also useful to measure the optical characteristics of turbid water, both deep and shallow, in order to predict visibility under specific turbidity conditions. Accordingly, although reference will be made hereinafter to measuring characteristics of sea water under conditions of artificial illumination, it should be understood that the instrument concepts are equally useful in measuring the optical characteristics of shallow water (both fresh and ocean water) and in connection with visibility under ambient light conditions. Such concepts are also useful in marine biology (measurements of absorption and scattering), physical oceanography (measurements of fine structure of water turbidity), commercial oceanography (photography, search) and commercial applications.

The characteristics of sea water which must be measured, or accurately estimated from other measurements, in order to predict or compare underwater visibility under conditions of artificial illumination are: the attenuation coefficient $\alpha$; the volume absorption coefficient $a$; the total scattering coefficient $s$; the backscattering coefficient $b$; and the distribution function of small forward scattering angles, i.e., the single scattering angular flux distribution in the region between maximum and about half-maximum intensity (from zero to about ½°).

It is assumed that the distribution function of small forward scattering angles is sufficiently similar in most natural ocean waters to generally alleviate the need for measuring that function in oceanographic studies. It may sometimes also be assumed that the ratio $b$:$s$ is sufficiently similar in most natural ocean waters to permit $s$ to be estimated from $b$. Besides the attenuation coefficient, it is then necessary to measure only the backscattering coefficient $b$ and the absorption coefficient $a$. In any case, it is useful to measure at least those two characteristics of water because absorption and scattering is due to particulate organic and inorganic materials in the water which can be expected to vary widely. That is unlike the atmosphere where absorption is normally negligible. On the other hand, since the coefficient of attenuation $\alpha$ is the sum of absorption and scattering coefficients $a+s$, if the coefficients $\alpha$ and $a$ can be measured, then the coefficient $s$ can be determined.

The scattering of light by the water is similar to the scattering of light by the atmosphere in that scattering in each media is very nonisotropic. However, the scattering of light in water is much more intense than in the atmosphere, with average distances between scattering events of the order of meters rather than kilometers. Thus, optical characteristics of sea water that affect visibility include scattering as well as absorption properties. Both properties limit visibility by removing illumination between the light source and the target, and imagebearing light between the target and the sensor. Backscattering can also affect visibility by reducing contrast, a phenomenon well known to all those who have attempted to drive an automobile through the fog with headlights.

Attenuation of light between the source and the target can be closely approximated through the use of the volume absorption coefficient $a$. For example, the ratio of underwater illumination I from a point source at distance R to output radiant power $P_o$ is approximately equal to the ratio $e^{1aR}$:$4\pi R^2$, where I is power per unit area and the absorption coefficient $a$ is the reciprocal of the average distance each photon traverses before being absorbed. The term "power" as used herein to refer to radiant power or illuminating power is the standard measure of power given by the product of photons per second and the energy per photon.

While absorption and scattering of light are factors which interact in a complex manner, it is assumed that the details of the interaction can be specified in a mathematical model. In terms of instrumentation, the task then is to: measure the attenuation coefficient $\alpha$; measure the absorption coefficient $a$ and the backscattering coefficient $b$; and determine from other measurements the total scattering coefficient $s$. It is then possible to predict visibility or response of a sensor of light transmitted from a source to a target.

In predicting visibility in sea water, two phenomena should be considered. The first is the effect of wavelength on attenuation. Except in coastal waters where appreciable quantities of yellow-colored organic material from decaying shore life are dissolved, sea water tends to absorb wavelengths outside a 0.48±0.05 $\mu$ region much more quickly than light inside that region. Accordingly, sea water is regarded as having a "window" for light in the blue-green region of the spectrum. Water characteristics are, therefore, customarily measured only within the blue-green region of the spectrum.

The second phenomenon is that scattered light that reaches the target serves to illuminate the target just as effectively as unscattered light. However, since scattering $s$ is mostly at narrow forward angles, the average path length actually traversed by light from the source to the target is only slightly greater than the straight line path length, and so the actual attenuation experienced due to absorption is only very slightly greater than $e^{1R}$ at ranges of several scattering mean free paths or less. Accordingly, the absorption coefficient $a$ is an appropriate measure of attenuation of scattered light, i.e., actual attenuation is very closely approximated by $e^{1aR}$, even at ranges of several scattering mean free paths. This makes prediction of attenuation by measurement of only absorption possible. By then measuring backscatter, contrast can also be predicted.

SUMMARY OF THE INVENTION

In accordance with the present invention, characteristics of a body of water which affect visibility are determined by measuring the coefficient of attenuation $\alpha$, the coefficient of absorption $a$, the backscattering coefficient $b$ and determining the coefficient of total scattering $s$ by subtracting the coefficient $a$ from the coefficient $\alpha$, or by estimating it from the measurement of backscattering $b$. The coefficient $\alpha$ is measured by a narrow-angle light transmitter and receiver (preferably with very narrow transmitter and receiver beamwidth half-angles). The radiant power input to the detector is then due to light unabsorbed and unscattered (except through very narrow forward angles) over a predetermined path length. The absorption coefficient $a$ is measured directly by a sensor facing the source of light after calibration. The backscattering coefficient is determined by measuring the illuminating power detected by a sensor facing away from the direction of the light source, and from that measurement, calculating the coefficient $b$. Since the apparatus for measuring the coefficients $a$ and $b$ are very similar, the only difference being the direction in which the detector is facing, the same calibration data are employed for determining the coefficient $b$ as for measuring the coefficient $a$ in accordance with Eq. (11) set forth hereinafter.

An alternative method of determining the total scattering coefficient $s$ is to determine the backscattering coefficient $b$ and estimate the scattering coefficient from the coefficient $b$. That is valid for bodies of water in which the ratio of $b:s$ is substantially constant, such as nonturbid sea water.

The apparatus for measuring the absorption coefficient $a$ comprises a light detector facing a source of light at a predetermined distance R. Both the light source and the detector are small so that the light source approaches a point-source, and the detector approaches a small segment of a sphere of radius R even though its face be flat. A flat diffuser in front of the detector provides a cosine response to the detector. Calibration is achieved by effectively changing the distance R in homogeneous water from $R_1$ to $R_2$ or vice versa. The ratio of radiant powers $Pd_1:Pd_2$ measured at the two known distances provides the coefficient $a$ in a self calibrating manner in accordance with Eq. (2) set forth hereinafter. That value of the coefficient $a$ is then used as part of the calibrating data required for determining the coefficient $b$. After calibration, the coefficient $a$ may be found from a single radiant power measurement Pd at a fixed distance R in accordance with Eq. (4) set forth hereinafter. The balance of the calibrating data required for determining the coefficient $b$ from radiant power measurements (with the detector facing away from the source, instead of toward it as for determining the coefficient $a$ is attained pursuant to Eq. (10) set forth hereinafter.

Although a single detector mounted on a frame may be employed for all measurements, three detectors are preferred, two at distances $R_1$ and $R_2$ for calibrating and determining the absorption coefficient $a$ and a third one mounted at a distance $R_3$ for determining the backscattering coefficient $b$. Each detector is used with the same light source, but so spaced as to not interfere with transmission of light to other detectors. A flat diffuser is placed near each detector with its face parallel to the face of the detector in order to provide a cosine response to the detector. Each detector may be provided with a filter to limit its response to some specific portion of the spectrum, for example, to the blue-green region of the spectrum. Other filters may be provided as desired, such as neutral density filters.

The novel features that are considered characteristic of this invention are set forth with particularity in the appended claims. The invention will best be understood from the following description when read in connection with the accompanying drawings.

DESCRIPTION OF THE PREFERRED EMBODIMENTS

The general principle of the present invention is based on the fact that radiant power $P_d$ measured by light detector will vary with the distance R from a point light source in accordance with the following equation:

$$P_d = P_o \frac{Ae^{-aR}}{4\pi R^2} \quad (1)$$

where; $P_o$=illuminating output power of source within the bandwidth of the detector;
$A$=area of detector;
$a$= absorption coefficient.

Figure 1:
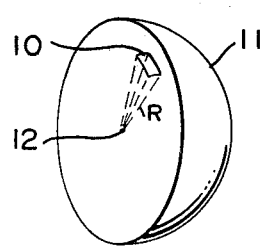
FIG. 1 shows a hemisphere with a segment thereof illuminated by a point source to illustrate the basis of the present invention.

The area A is ideally a segment 10 of a spherical surface 11 surrounding a point source of light 12, as shown in FIG. 1, but may be a flat plate if sufficiently small to approximate the segment 10. For simplicity of the drawing, only half of the spherical surface is shown. Thus, the system can first be visualized as a spherical irradiance detector with a point source at the center, then visualized with the detector covering only a small segment of the sphere, and finally realized as a flat detector having an area A much smaller than $4\pi R^2$. The ratio of illuminating power incident on the flat detector ($P_d$) to the total irradiance power reaching the entire imaginary spherical surface ($P_o e^{1aR}$) is substantially equal to the ratio $A:4\pi R^2$. Since the distance R and area A are known, and $P_o$ can be measured as the power output of the source, the coefficient of absorption $a$ can be determined by measuring the detected power $P_d$.

Figure 2:
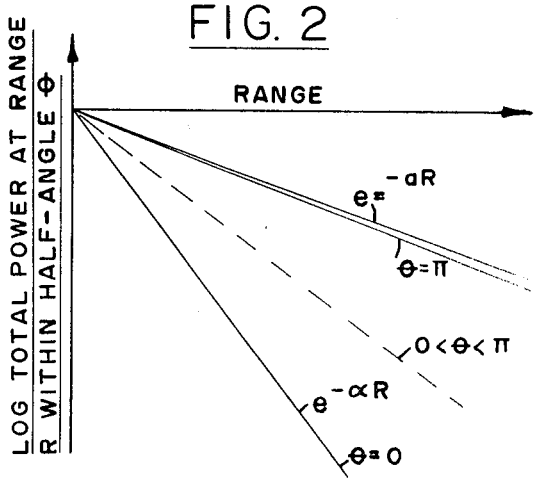
FIG. 2 shows variation of detected radiant power with range as would be measured by a hypothetical meter of attenuation $\alpha$ with a detector having a variable acceptance angle and a very large aperture to illustrate the principle of the present invention.

The principle of the present invention may be better appreciated from the diagram of FIG. 2 which shows the theoretical variation of power from a light source with distance R. FIG. 2 is a logarithmic plot of detector power ($1n$ $P_d$) measured by a hypothetical meter of attenuation. Such an attenuation meter may consist of a stable source of light, such as a tungsten bulb with a constant current through it, illuminating a detector with a large active area. A mask with a variable opening is placed in front of the detector to vary the acceptance angle of the detector. As the acceptance angle $\Theta$ closely approaches zero, the measured power would be as shown by the lower curve labeled $e^1\alpha^R$. As $\Theta$ is increased, the measured power at a given distance R would also increase. When $\Theta$ approaches 180°, the measured power will closely approach $e^{1aR}$. This is because all of the unabsorbed, forward-scattered photons are measured. The difference in slope between the curve labeled $\Theta=\pi$ and the curve labeled $e^{1aR}$ represents the fact that scattering causes some flux to travel a distance greater than R. This scattered flux has a higher probability of being absorbed, thereby decreasing the measured power $e^{1aR}$ to below the level $\Theta=\pi$ if no scattering takes place. The difference, however, is very small. Independent research has verified this close relationship between the curves $e^{1aR}$ and $\Theta=\pi$. Accordingly, the basis for the present invention is that the absorption coefficient $a$ may be determined from Eq. (1) if radiant power is measured with a detector having an acceptance angle approaching 180°. In otherwords, the radiant power detected ($P_d$) from the source will decrease directly with the square of distance R and further decrease exponentially with the distance R for a given absorption coefficient $a$. Therefore, knowing $P_o$, A and R permits determining the absorption coefficient $a$ from a detector power measurement $P_d$.

Figure 3:
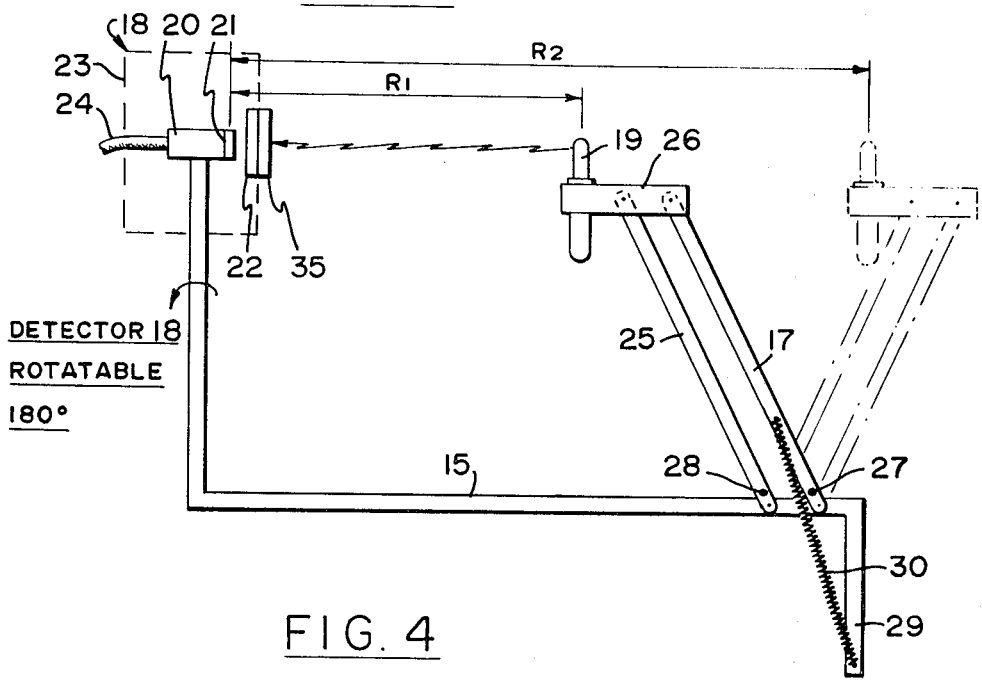
FIG. 3 shows diagrammatically a sideview of one exemplary form of measuring apparatus according to the invention.

One simple form of measuring apparatus for the absorption coefficient $a$ is shown in FIG. 3. It comprises a supporting frame 15 having a rigid upright arm 16 and a pivoted upright arm 17. One arm supports a cosine detector 18 and the other supports a light source 19.

A "cosine detector" is a light-measuring instrument which has a light-collecting surface known as a cosine (or lambert) collector that will provide measurements which stay constant as the collecting surface is turned in all possible ways to accept a beam of fixed amount and type of radiant energy. In other words, the cosine detector reading is independent of the angle of incidence of a beam of radiant energy on its collecting surface.

A "cosine collector" usually consists of a flat diffusing (translucent) material —typically opal glass. Thus, a light-measuring instrument which incorporates a cosine collector is commonly called a "cosine detector" and typically consists of a detector (photomultiplier, photodiode, and the like) positioned closely behind a piece of flat diffusing material; the only light reaching the detector passes through that material.

In the exemplary form of the present invention illustrated in FIG. 3, the cosine detector 18 comprises a photomultiplier 20 having its collecting surface 21 positioned closely behind a piece of opal glass 22. The photomultiplier tube is mounted within a water and lighttight housing represented schematically by a dotted line 23. Connection to the photomultiplier is through a watertight cable 24.

Another pivoted arm 25 is provided to facilitate varying the distance R from one predetermined value $R_1$ to another $R_2$. By making both pivoted arms 17 and 25 the same length, and pivotally connecting them to a base 26 for the light source 19 the same distance apart as to the frame 15, the orientation of the light source to the detector is maintained constant as the distance is varied. Rigid pins 27 and 28 pass through the arms 17 and 25 and into the path of the frame 15 so that, as the arms 17 and 25 are pivoted, the pins 27 and 28 limit the travel of the light source 19 to two extreme positions which define the distances $R_1$ and $R_2$. A second rigid arm 29 on the frame 15 anchors a spring 30 connected to the pivotal arm 17 to hold it in each of two extreme positions as shown.

The light source 19 may be, for example, a 100 watt, 12 volt, quartz-iodine light bulb within a watertight Pyrex envelope. A Wratten filter 35 is placed over the flat diffuser (opal glass) 22 in the window of the housing 23 to limit response to the blue-green region of the spectrum. Different neutral density filters may also be selectively placed over the flat diffuser 22. The window of the housing 23 covered by the flat diffuser 22 is made sufficiently large for the acceptance angle of the cosine detector 18 to approach 180°.

Figure 4:
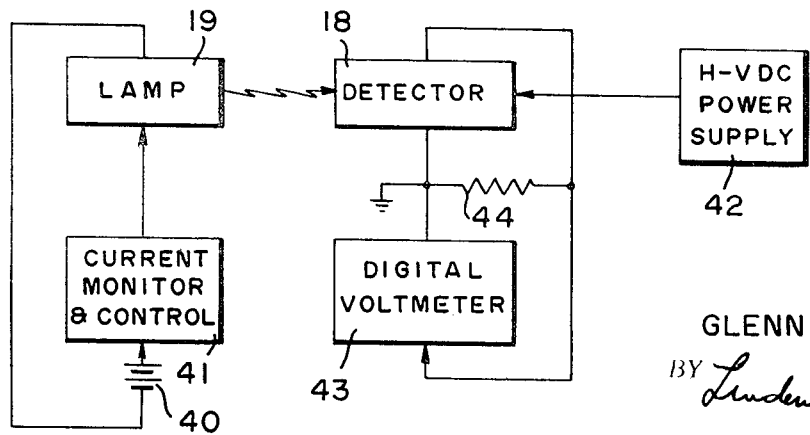
FIG. 4 shows a block diagram of the electronic system for the present invention illustrated in FIG. 3.

The detector housing 23 is adapted to rotate 180° to measure backscattered light as will be described more fully hereinafter. For either type of measurement, the electronic system of FIG. 4 is used. It comprises a storage battery 40 connected in series with the filament of the light source 19 and a current monitor and control module 41. The latter may consist of a digital voltmeter for measuring current through the filament of the light source 19 and one or more potentiometers for adjusting the current. The detector 18 is provided with a high voltage (1,250 VDC) power supply 42 and a digital voltmeter 43 which measures the voltage across a load resistor 44 in series with the detector 18. The output of the digital voltmeter 43 is then proportional to the radiant power $P_d$ detected.

An important characteristic of the present invention is that it is self-calibrating. By simply changing the distance $R_1$ to the distance $R_2$ in homogeneous water, the device is calibrated. In other words, the present invention only requires that the distance be varied from one predetermined value $R_1$ to another known value $R_2$ in order that the absorption coefficient be determinable from the following equation:

$$a(R_2-R_1) = 2\ln\frac{R_1}{R_2} + \ln\frac{P_{d1}}{P_{d2}} \quad (2)$$

Thus, the ratio $P_{d1}:P_{d2}$ of radiant powers detected at two known distances provides a measurement of the coefficient $a$. This method is independent of the output power $P_o$ of the source 19, and permits easy and frequent recalibration. However, photometric calibration may be undertaken and once calibrated, by either method, the distance may be kept constant and the coefficient $a$ may be found from a single detector power measurement $P_d$, assuming $P_o$ remains constant, from the following equation:

$$a = \frac{\ln C - \ln P_d}{R} \quad (3)$$

where C is a constant obtained by a calibration operation based on Eq. (1) and has the following value:

$$C = \frac{P_o A}{4\pi R^2} \quad (4)$$

In other words, having found the coefficient of absorption $a$ in accordance with Eq. (2) the value of C may be found from Eq. (1) by using that value of the coefficient and, for example, the power measurement $P_{d1}$ at distance $R_1$ in accordance with the following equation:

$$C = P_{d1}e^{aR_1} \quad (5)$$

The advantage of using this technique is, for example, being able to obtain the absorption coefficient $a$ at different depths with just one measurement of radiant power Pd at each level, instead of two as for the self calibrating technique of Eq. (2).

Errors in the values of the absorption coefficient determined by this method and apparatus can be caused by variations in power output $P_o$, errors in measurement of distances $R_1$ and $R_2$, and errors in measurement of the voltage across the load resistor 44 (i.e., the power of irradiation detected). Detector noise is too low to be a source of error with a 100 watt quartz-iodine light bulb for the source 19 and a photomultiplier tube for the detector 18. Error due to ambient light can be eliminated by operation in the dark, or by measuring the difference in the light detected with the source on and off, or by using a pulsed light source of high intensity and matched amplifier circuits following the detector as will be described with reference to FIG. 5 and 6. Thus, only inherent errors are of any real consequence.

Considering all possible errors, including errors due to the light source 19 being somewhat nonisotropic and not a point source, overall accuracy achievable in the measurement of the absorption coefficient $a$ is believed to be within ±0.01 m.[11]. This, of course, is on the assumption that scattering of light will not cause the photon path from the source to the detector to vary significantly. This is true in all waters except those within the surf zone or within the region of suspended sediment near a disturbed bottom, for in all other parts of the ocean, the average nonabsorbed photon does not travel significantly more than the distance between the source 19 and the detector 18. This is so because scattering is predominantly at narrow forward angles, and because the scattering mean free paths are long compared to likely dimensions of $R_1$ and $R_2$, the longest of which would not exceed 1 meter. In practice $R_1$ may be 0.65 m. and $R_2$ less than 1 meter. Thus, in water where the forward scattering coefficient $s$ does not exceed 0.2 m.[11], Eq. (1) on which the present invention is based may be used in spite of small inherent errors of even a few percent in values of the absorption coefficient as that would not be significant and would, in fact, be less than errors in measurement.

Figure 5:
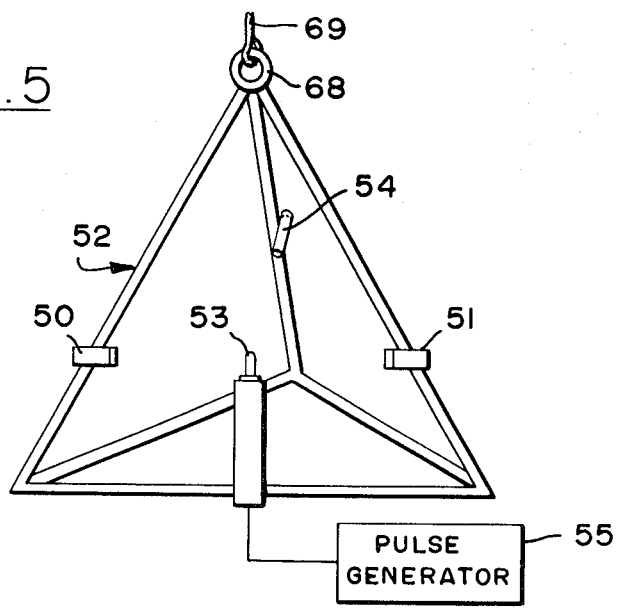
FIG. 5 illustrates diagrammatically another exemplary form of the present invention.

For more rigorous measurements, an error analysis may be made and corrections applied, and for greater precision in establishing $R_1$ and $R_2$, two cosine detectors 50 and 51 may be permanently mounted on a frame 52 at fixed distances $R_1$ and $R_2$ from a source 53 as shown in FIG. 5. The source 53 is so rigidly mounted on the frame 52 as to be between detectors 50 and 51, but not in a straight line because if the two detectors were to face each other on a straight line the face of each would reflect spectrally into the other and induce errors.

To measure the backscattering coefficient $b$, the irradiance detector 18 of FIG. 3, employed to measure the absorption coefficient $a$ in accordance with Eq. (2) or (4), is rotated 180° so that it faces away from the light source. Light backscattered from a concentric sphere of greater radius Z is then detected except from that volume of the body of water in the shadow of the detector itself which is not significant because of the small solid angle involved. The power $P_z$ of light that reaches the entire surface of the larger sphere at distance Z from the source will be about $$P_z = P_o e^{1az} \quad (6)$$

The backscattered power $P_{Bz}$ from a volume element dZ thick at distance Z will be:

$$P_{Bz} = P_o e^{1az} b\, dZ \quad (7)$$

where the backscattering coefficient $b$ represents scattering at angles of more than 90°. Assuming the detector is a complete sphere and is transparent to light radiating out from the source, but not to light backscattered from the source, but not to light backscattered from the larger sphere, the power at the detector $P_I$ would be given by the following equation:

$$P_I = bP_0 e^{aR} \int_R^\infty e^{-2aZ} \left(1 - \sqrt{1 - \frac{R^2}{Z^2}}\right) dZ \qquad (8)$$

Since only a small flat detector is employed of area A, the power at the detector $P_D$ is given by the following equation:

$$P_D = bP_0 \frac{A}{4\pi R^2} e^{aR} \int_R^\infty e^{-2aZ} \left(1 - \sqrt{1 - \frac{R^2}{Z^2}}\right) dZ \qquad (9)$$

This approximation assumes that all photons backscattered to the detector travel a distance of 2Z-R. Increases in path length due to multiple scattering can be ignored just as in making absorption coefficient measurements.

A convenient way of calibrating the instrument for backscatter measurements is to use measured values of R and $V_1$, and the determined value of the absorption coefficient $a$ in the following equation:

$$P_o' oA = 4\pi R^2 V_1 e^{aR} \qquad (10)$$

where $V_1$ 1 is a voltage measurement across the load resistor 44 instead of a detected power measurement, and $P_o'$ is in units of volts; otherwise, Eq. (10) is the same as Eq. (1), but rearranged. The backscattering coefficient may then be calculated from the following equation:

$$b = V_2 P_0' A^{-1} (4\pi R^2) e^{-aR} \left[\int_R^\infty e^{-2aZ} \left(1 - \sqrt{1 - \frac{R^2}{Z^2}}\right) dZ\right]^{-1} \qquad (11)$$

where $V_2$ is the output voltage of the detector made with the same load resistor 44 as in measuring $V_1$. The quantity $P_o'A$ is a constant for any given set of conditions relating to source, detector, load resistor and voltage meter.

Measurements of the backscattering coefficient are generally subject to the same errors as measurements of the absorption coefficient $a$ which are not more than a few percent for water having total scattering coefficient $s$ of not more than 0.2 m.[11], as noted hereinbefore. Additionally, backscattering (scattering within the back hemisphere) is somewhat nonisotropic and error in estimation of the distribution function within the back hemisphere will cause an additional inherent error. However, the distribution function appears to be quite similar among different waters. When errors of all sources are considered, including occulting of the sector near 180° by the detector, overall accuracy achievable in the measurement of the backscattering coefficient $b$ is believed to be within ±10 percent. For more rigorous measurements, an error analysis may be made and corrections applied.

Although a single detector can be employed for determining both absorption and backscattering coefficients by so mounting the detector that it can be rotated away from the source, as noted hereinbefore with reference to FIG. 3, it is preferred to have a separate detector 54 permanently mounted on a supporting frame 52 facing away from the source 53 as shown in FIG. 5. Thus, a three-detector system is preferred for absorption and backscatter coefficient measurements. Once those measurements have been made, the total scattering coefficient $s$ may be determined.

The total scattering coefficient (the reciprocal of the scattering mean free path) is an important measure of visibility range. In general, the coefficients $a$ and $s$ must be known separately in order to determine the visibility-limiting characteristics of water. Since the attenuation of image-bearing light between the target and the sensor expressed by the coefficient $\alpha$ can be measured, and that coefficient is equal to the sum of the coefficients $a$ and $s$, measurement of the coefficients $\alpha$ and $a$ yields the forward scattering coefficient $s$. Alternatively, in most natural (nonturbid) ocean waters $s$ can be estimated from $b$ once the ratio $b:s$ has been determined since the ratio $b:s$ is sufficiently constant at different depths and locations of the same body of ocean water.

Although the power of light detected by each of the cosine detectors in the arrangement of FIG. 5 could be measured by the arrangement of FIG. 4, it is preferred to use a pulsed light source, such as on Xenon lamp, while making measurements of the absorption coefficient $a$, thereby reducing the effect of photocurrent resulting from background light, i.e., ambient light from the sky, sun, etc. Each light pulse wave envelope is ideally rectangular and emanates from the source 53 which approximates a point source. However, in practice the wave envelope of the light pulse may be of the form customarily provided by an Xenon lamp for photographic use, which is with a rapid rise to peak intensity followed by a less rapid fall.

The signal from 10 given detector is passed through a low-pass RC circuit having a time constant $\tau_1$ less than the pulse duration T of, for example, 0.3 ms. in duration and through a high-pass filter impedance-matching amplifier with a matching time constant $\tau_2$ at least 10 times the pulse-to-pulse time interval. If $\tau_1 = 0.25$ T and the effective bandwidth $\Delta f$ of the electronic band-pass filter is $1/(2\tau_1)$, then $\Delta f = 2/T$. It may be shown that these time constants will result in a 90 percent filter response and good pulse-to-pulse discrimination. The resulting signal-to-noise ratio at the output of the amplifier is 80 percent of the signal-to-noise ratio at the input of the amplifier.

A pulse generator 55 is provided to trigger the light source 53 in a manner well known to those skilled in the art. An electronic flash unit may be provided with a fixed flash rate, or a flash rate which can be varied in the same manner as for photography. Alternatively, the pulse generator 55 may be adapted to trigger the Xenon light source 53 in response to a manually actuated switch to produce the desired light pulse. In either case, the pulse generator 55 is preferably enclosed within the watertight housing for the Xenon lamp. For manual operation, a cable may be provided to trigger the pulse generator 55 from outside the body of water.

Figure 6:
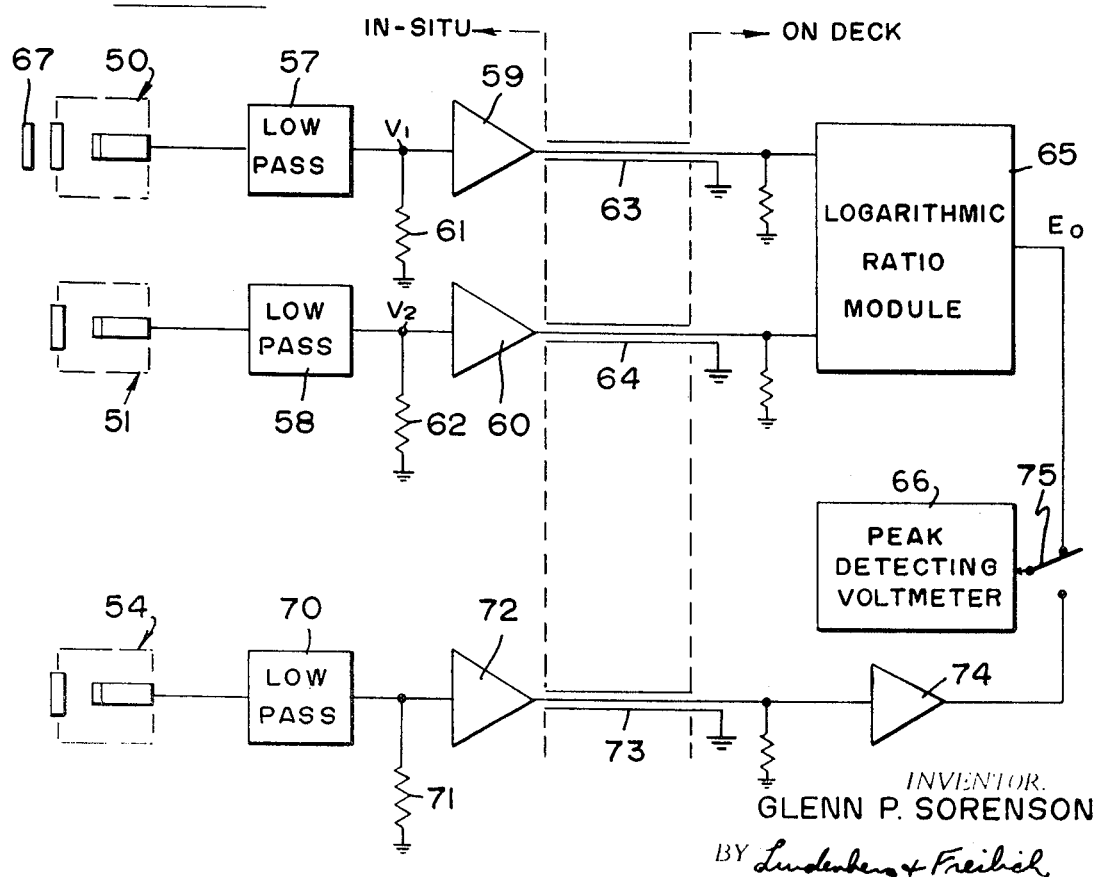
FIG. 6 shows a block diagram of an electronic system for the exemplary form of the invention illustrated in FIG. 5.

Fig. 6 shows a block diagram of an electronic system for the transmission and conversion of detector signals to a voltage signal $E_o$ proportional to the absorption coefficient using a pulsed light source. Each of two low-pass filters 57 and 58 is provided with the time constant $\tau_1$ and each of two impedance-matching amplifiers 59 and 60 is provided with the time constant $\tau_2$. The optimum value for load resistors 61 and 62 is determined (by the inherent capacitance C of the detectors and the light pulse width T) to be the reciprocal of $2C\Delta F$, where $\Delta f$ is the electronic frequency cutoff equal to $2/T$. The impedance-matching amplifiers 59 and 60 may be, for example, emitter followers in a solid-state system. They do not alter the output signals $V_1$ and $V_2$ across the load resistors 61 and 62, but increase the signal power for transmission through 50 $\Omega$ cables 63 and 64 to a log ratio module 65. In practice, the filters, load resistors, and impedance-matching amplifiers would be included in the watertight housings of the detectors 50 and 51.

The use of a single detector as described with reference to FIGS. 3 and 4 provides ease of calibration, but requires that the detector be repositioned to the precise positions for the distances $R_1$ and $R_2$. Errors due to variations in the distances $R_1$ and $R_2$ can be substantial when they are assumed to be as measured preliminarily. For example, a 5-mm. variation in the difference $R_2 - R_1$ will cause an error in measurement of the absorption coefficient $a$ of 0.04 m.[11] when $R_2 - R_1$ is intended to be 50 cm. That is significant because open-ocean values of the absorption coefficient are generally within the range of about 0.02 m.[11] to about 0.1 m.[11]. Use of multiple detectors 50 and 51, on the other hand, will assure measurement accuracy if the distances between the detectors and the light source is rigid. When that condition of rigidity is substantially satisfied, the output signals $V_1$ and $V_2$ from the amplifiers 57 and 58 (which signals are proportional to the power of light incident on the respective detectors 50 and 51) may be applied to a logarithmic ratio module 63 that will take the logarithm of the ratio $V_2:V_1$ and provide the voltage signal $E_o$ directly proportional to the absorption coefficient $a$. This logarithmic-ratio transfer function makes real-time readout through a peak-detecting voltmeter 66 possible.

Another advantage of using two light detectors illuminated simultaneously by a single light source is that current through the light source need not be monitored to maintain the output power of light constant. In other words, the coefficient $a$ can be measured independent of the source output power.

In order to utilize the most sensitive voltage input range of the circuit module 65, the two voltage signals $V_1$ and $V_2$ must be of about the same level. To accomplish that, a neutral density filter 67 is placed over the detector 50, thereby offsetting the signal level of the detector 50 due to its position closer to the light source 53. Otherwise the closer detector would receive more light (if both are of the same area A) because the solid angle of the closer one equal to $A/R_1^2$ is greater than the solid angle $A/R_2^2$. Therefore, to exactly compensate, the filter 67 must have a transmissivity of $$Tr = \frac{R_1^2}{R_2^2} \quad (12)$$

When the filter 67 is in place, any difference in voltage signals $V_1$ and $V_2$ is due only to the absorption of light in the water path of length $R_2-R_1$. Another way the output voltages from the two detectors 50 and 51 can be effectively equalized is by using variable load resistors 61 and 62 or variable gain amplifiers 59 and 60 to compensate for the $R^2$ differences. Calibration may be accomplished in air (where $a=0$), or alternatively a second light source may be positioned equidistant from the two detectors 50 and 51 to provide in situ calibration by equalizing the levels of the output signals $V_1$ and $V_2$.

Since system sensitivity increases linearly with increasing path difference ($R_2-R_1$), an actual instrument could theoretically be made with as much sensitivity as desired by simply increasing the path difference. However, the length of the instrument must be limited due to other considerations, such as rigidity in the distances $R_1$ and $R_2$, and light source power.

Rigidity is provided in a simple way by the frame 52 illustrated in FIG. 5. If the third detector 54 is not required for backscatter coefficient measurements, or one of the detectors 50 and 51 is adapted to be rotated 180° for use in such measurements, the frame 52 may consist of a simple triangle with a ring 68 at the apex. For high strength-to-weight ratio, aluminum is the preferred material for the frame 52. When anodized black, it will reflect very little light from the source 53 to the detectors. A preferred shape and maximum length for each side of the frame 52 is an extruded square tube 10 feet long with ⅛-inch walls. Greater length will increase sensitivity and decrease error associated with the logarithmic ratio module 63, but may result in excessive flexure error due to "G" forces (acceleration) caused by heaving of the ship from which the instrument is suspended by a taut cable 69 attached to the ring 68, and drag forces due to relative motion of the instrument and the water. In each case, the force will act parallel to the cable 69.

If the third detector 54 is provided as shown in FIG. 5, it is provided with a low-pass filter 70, load resistor 71 and high-pass impedance-matching amplifier 72 in order to couple the detector 54 to instrumentation on deck through a cable 73 in a manner similar to the way the detectors 50 and 51 are coupled to instrumentation. The amplifier 72 is connected to the peak-detecting voltmeter 66 via a suitable amplifier 74 by a switch 75 while making backscattering coefficient measurements.

Although exemplary embodiments have been specifically disclosed, it should be understood that practice of the invention is not limited to those embodiments. Modifications and variations falling within the spirit of the invention will occur to those skilled in the art. Therefore, it is not intended that the scope of the invention be determined by the disclosed exemplary embodiments, but rather should be determined by the breadth of the appended claims.

I claim:
1. In apparatus having a small source of light, light detection means comprised of at least one light detector having its detection surface of area A facing said source at an arbitrary distance R for determining the absorption coefficient $a$ of a body of fluid on the basis of the following equation:

$$P_d = P_o \frac{Ae^{-aR}}{4\pi R^2}$$

where $P_o$ is the output power of said source, and $P_d$ is radiant power incident on said detection surface of said detection means, using the following equation:

$$A(R_1-R_2) = 2 \ln \frac{R_1}{R_2} + \ln \frac{P_{d1}}{P_{d2}}$$

where $P_{d1}$ and $P_{d2}$ are irradiation powers detected at two known distances $R_1$ and $R_2$, the combination of
 means for spacing said detection surface of said detection means from said source at said distances, $R_1$ and $R_2$
 means for maintaining output power of said source constant, and
 means for measuring radiant power incident on said detection surface of said detection means at said two known distances $R_1$ and $R_2$ while said output power is maintained constant, said light detector of said detection means being a substantially flat cosine detector with said light detection surface area so small that it approaches the shape of a section of an imaginary sphere surrounding said source and passing through said light detection surface at each of said distances $R_1$ and $R_2$.

2. In apparatus having a small source of light, a light detector having its detection surface facing away from said source for determining the backscattering coefficient $b$ of a body of fluid on the basis of the following equation:

$$P_{BZ} = P_o e^{-aZ} b dZ$$

where $P_o$ is the output power of said source and $P_{BZ}$ is power of light from said source backscattered from a volume element of said fluid dZ thick at radius Z from said source, and $a$ is the absorption coefficient of said fluid, using the following equation:

$$P_D = bP_o \left(\frac{A}{4\pi R^2}\right) e^{aR} \int_R^\infty e^{-2aZ} 1 - \sqrt{1-\frac{R^2}{Z^2}} dZ$$

where $P_D$ is irradiation power detected of backscattered light incident on said detector,
 means for spacing said detector with its detection surface at an arbitrary distance R from said source,
 means for maintaining output power of said source at a known constant $P_o$, and
 means for measuring said irradiation power $P_D$ incident on said detector, said detector being a substantially flat cosine detector with a detection surface having an area so small that it approaches the shape of a section of an imaginary sphere of radius R surrounding said source.

3. Apparatus for measuring the light absorption coefficient $a$ of a body of fluid comprising a small unshielded source of light and at least one cosine light detector disposed with its light detection surface facing said source at a predetermined distance R to receive light therefrom transmitted directly through said body of fluid, said light detector having a light detection surface of an area so small as compared to the surface area $4\pi R^2$ of an imaginary sphere surrounding said source that said detection surface of said detector approaches the configuration of a section of said sphere, said apparatus including means for maintaining the output power of said source constant, and means for measuring the power of light incident on said detector from said source.

4. Apparatus for measuring the light backscatter coefficient $b$ of a body of fluid comprising a small unshielded source of light and a cosine light detector disposed with its light detection surface facing away from said source at a predetermined distance R to receive backscattered light originating from said light source, said light detector having a light detection surface of an area so small as compared to the surface area $4\pi R^2$ of an imaginary sphere surrounding said source that said detection surface of said detector approaches the configuration of a section of said sphere, said apparatus including means for maintaining the output power of said source constant, and means for measuring the power of light incident on said detector from said source.

5. Apparatus for measuring the light absorption coefficient $a$ of a body of fluid comprising a small light source and two flat light detectors rigidly disposed at different distances about said source with their light detection surfaces facing said source for receiving light therefrom, each of said light detection surfaces of said two flat light detectors being of an area so small as compared to the surface area of an imaginary sphere passing therethrough and centered around said source that said light detection surface area approaches the configuration of a section of said sphere, each of said detectors being a cosine detector for producing a signal proportional to the power of light incident on its light detection surface, and means for producing an output signal proportional to said absorption coefficient $a$ from the logarithm of the ratio of signals from both of said light detectors.

6. Apparatus as defined in claim 5 for further measuring backscattering coefficient $b$ of said body of fluid including a third light detector disposed about said source in a position which will not occlude transmission of light from said source through said fluid to said other detectors, said third detector being oriented to receive light thereon from a direction directly away from said source and having a substantially flat light detection surface of an area so small as compared to the surface area of an imaginary sphere passing therethrough and centered around said source that said light detection surface area approaches the configuration of a section of said sphere.

* * * * *